(12) United States Patent
Akamatsu et al.

(10) Patent No.: US 11,467,482 B2
(45) Date of Patent: Oct. 11, 2022

(54) SIGNAL PROCESSING DEVICE, SIGNAL PROCESSING METHOD, AND IMAGE CAPTURE DEVICE

(71) Applicant: SONY CORPORATION, Tokyo (JP)

(72) Inventors: Norihiko Akamatsu, Tokyo (JP); Yoshitaka Miyatani, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/250,659

(22) PCT Filed: Jul. 19, 2019

(86) PCT No.: PCT/JP2019/028410
§ 371 (c)(1),
(2) Date: Feb. 17, 2021

(87) PCT Pub. No.: WO2020/044844
PCT Pub. Date: Mar. 5, 2020

(65) Prior Publication Data
US 2022/0121100 A1   Apr. 21, 2022

(30) Foreign Application Priority Data

Aug. 29, 2018 (JP) .............................. JP2018-160797

(51) Int. Cl.
G03B 37/06 (2021.01)
H04N 5/232 (2006.01)
G03B 13/36 (2021.01)

(52) U.S. Cl.
CPC ............ *G03B 37/06* (2013.01); *G03B 13/36* (2013.01); *H04N 5/232122* (2018.08); *H04N 5/232127* (2018.08); *H04N 5/232939* (2018.08)

(58) Field of Classification Search
CPC ........ G03B 37/06; G03B 13/36; G03B 17/18; H04N 5/232122; H04N 5/232127; H04N 5/232939; H04N 5/225; H04N 5/232
See application file for complete search history.

(56) References Cited

U.S. PATENT DOCUMENTS

| | | | | |
|---|---|---|---|---|
| 5,502,486 A | * | 3/1996 | Ueda | H04N 5/9206 |
| | | | | 386/E5.069 |
| 2005/0166249 A1 | * | 7/2005 | Kettle | H04N 7/0122 |
| | | | | 348/580 |
| 2006/0146174 A1 | * | 7/2006 | Hagino | G06V 10/23 |
| | | | | 348/349 |

(Continued)

FOREIGN PATENT DOCUMENTS

| | | |
|---|---|---|
| EP | 1593997 A1 | 11/2005 |
| JP | 06-14239 A | 1/1994 |

(Continued)

OTHER PUBLICATIONS

International Search Report and Written Opinion of PCT Application No. PCT/JP2019/028410, dated Oct. 21, 2019, 09 pages of ISRWO.

(Continued)

*Primary Examiner* — Abdelaaziz Tissire
(74) *Attorney, Agent, or Firm* — Chip Law Group

(57) ABSTRACT

A signal processing device performs a displaying process in a display unit on the basis of a parameter being predetermined in an image capture device provided with an anamorphic lens.

11 Claims, 10 Drawing Sheets

(56) References Cited

U.S. PATENT DOCUMENTS

| | | | | |
|---|---|---|---|---|
| 2010/0150538 A1* | 6/2010 | Ono | ................ | H04N 5/232122 |
| | | | | 396/104 |
| 2018/0063445 A1* | 3/2018 | Ogaki | ................ | H04N 5/2628 |
| 2018/0124324 A1 | 5/2018 | Takasawa | | |
| 2018/0278856 A1* | 9/2018 | Uemura | ........... | H04N 5/232933 |
| 2018/0338091 A1* | 11/2018 | Akimoto | ............ | H04N 5/23293 |

FOREIGN PATENT DOCUMENTS

| | | | |
|---|---|---|---|
| JP | 3278206 B2 | 4/2002 | |
| JP | 2011-053301 A | 3/2011 | |
| JP | 2017-175304 A | 9/2017 | |
| JP | 2018-074514 A | 5/2018 | |

OTHER PUBLICATIONS

Partial European Search Report of EP Application No. dated Sep. 10, 2021.

* cited by examiner

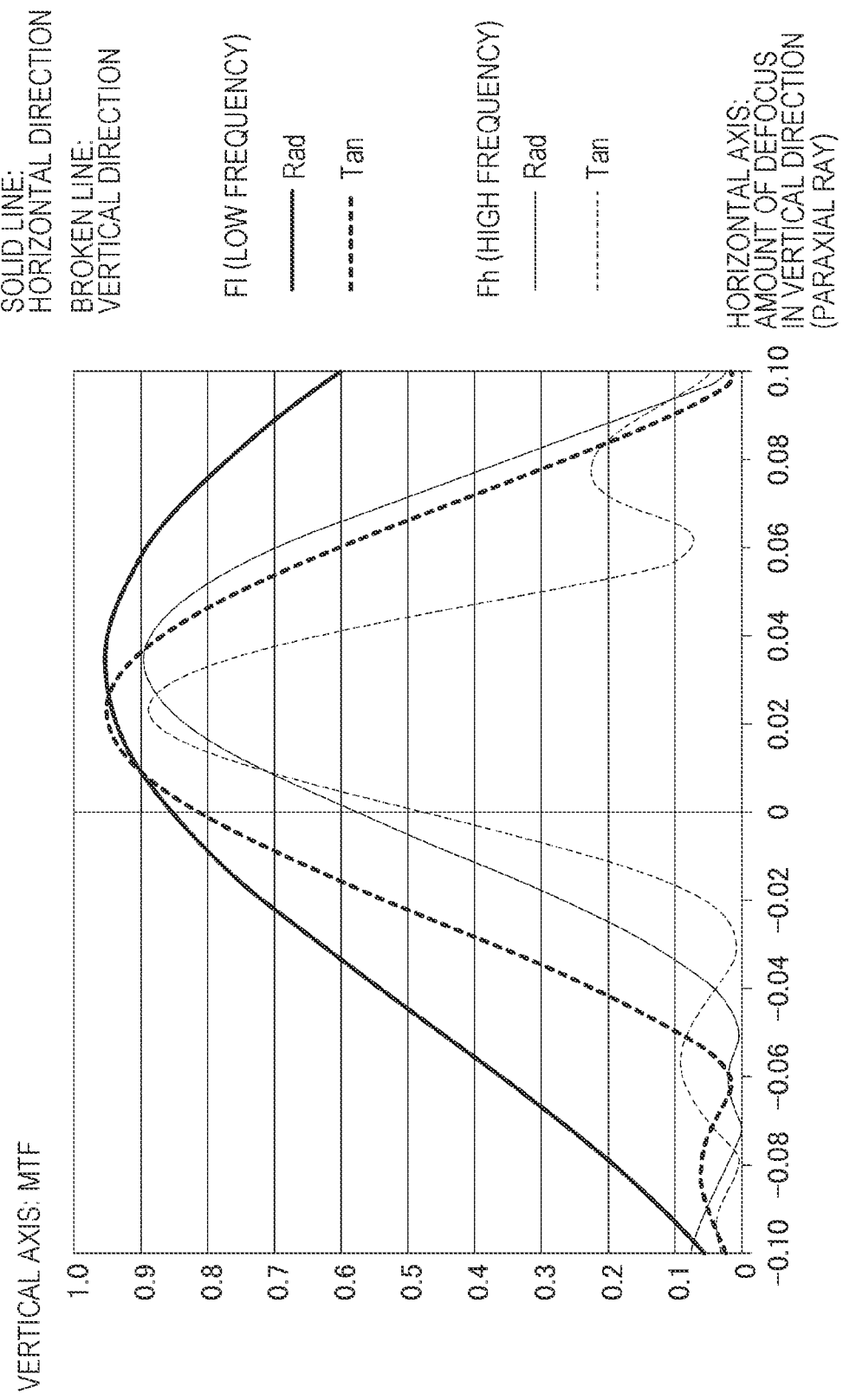

SIGNAL PROCESSING DEVICE, SIGNAL PROCESSING METHOD, AND IMAGE CAPTURE DEVICE

CROSS REFERENCE TO RELATED APPLICATIONS

This application is a U.S. National Phase of International Patent Application No. PCT/JP2019/028410 filed on Jul. 19, 2019, which claims priority benefit of Japanese Patent Application No. JP 2018-160797 filed in the Japan Patent Office on Aug. 29, 2018. Each of the above-referenced applications is hereby incorporated herein by reference in its entirety.

TECHNICAL FIELD

The present technology relates to a signal processing device, a signal processing method, a signal processing program, and an image capture device.

BACKGROUND ART

A general camera lens is designed to be optically symmetrical in the rotation direction with respect to the lens optical axis. However, for example, a special lens such as an anamorphic lens used for cinema photography or the like is intentionally designed to have different optical characteristics in the horizontal and vertical directions.

An anamorphic lens is a lens that has different optical characteristics (focal length) in the vertical and horizontal directions. Generally, the anamorphic lens is designed so that the focal length in the horizontal direction is short, and an image is recorded in a state that the image is compressed in the horizontal direction when imaging. Then, by stretching the image in the horizontal direction when reproducing the image, it is possible to reproduce a horizontally long natural image being equal to or larger than an aspect of a recording element.

These days, in many cameras, focus-related functions such as a focus indication that indicates whether the subject is in focus or not, an in-focus area indication that indicates an area being in focus, a person detection function that detects a face of a person and determines an area to be focused on, and the like are installed, and in many cases, appropriate display and control are performed by using information regarding optical characteristics of a lens being used such as a focal length, an F value, and the like.

However, these functions of a general camera are designed on the premise that the optical characteristics of the imaging lens are rotationally symmetric and the characteristics in the horizontal and vertical directions are the same.

Therefore, in order to eliminate the performance degradation caused by changing the aspect ratio when the anamorphic lens is attached, a method of changing the size of a detection area for such as autofocus, exposure, white balance, and the like on the basis of information regarding the aspect ratio has been proposed (Patent Document 1).

CITATION LIST

Patent Document

Patent Document 1: Japanese Patent No. 3278206

SUMMARY OF THE INVENTION

Problems to be Solved by the Invention

However, in Patent Document 1, a method for controlling various functions due to the difference in optical characteristics between the horizontal direction and the vertical direction of the anamorphic lens has not been proposed and is unsolved.

The present technology has been made in view of such points, and in an image capture device provided with the anamorphic lens, it is an object of the present technology to provide a signal processing device, a signal processing method, a signal processing program, and an image capture device, in which a user can use a function equipped with a general image capture device without any special operation or handling.

Solutions to Problems

In order to solve the problems described above, a first technology is a signal processing device that performs a displaying process in a display unit on the basis of a predetermined parameter in an image capture device provided with an anamorphic lens.

Also, a second technology is a signal processing method for, on the basis of a predetermined parameter in an image capture device provided with an anamorphic lens, performing a displaying process in a display unit included in the image capture device.

Also, a third technology is a signal processing program that causes a computer to execute a signal processing method for, on the basis of a predetermined parameter in an image capture device provided with an anamorphic lens, performing a displaying process in a display unit included in the image capture device.

Also, a fourth technology is an image capture device including an anamorphic lens and a signal processing unit that performs a displaying process in a display unit on the basis of a predetermined parameter.

Effects of the Invention

According to the present technology, in an image capture device provided with an anamorphic lens, a user can use a function equipped with a general image capture device without any special operation or handling. Note that the effects described in the present disclosure are not necessarily limited, and the effects described in the present disclosure may be any of the effects described in the specification.

BRIEF DESCRIPTION OF DRAWINGS

FIG. 2 is a graph illustrating characteristics of an anamorphic lens.

MODE FOR CARRYING OUT THE INVENTION

Hereinafter, embodiments of the present technology will be described with reference to the drawings. Note that the description will be given in the following order.

<1. Embodiment>
[1-1. Configuration of image capture device]
[1-2. Characteristics of anamorphic lens]
[1-3. First displaying process by signal processing device: Displaying in-focus mark]
[1-4. Second displaying process by signal processing device: Processing in-focus area]
<2. Modification example>

1. Embodiment

[1-1. Configuration of Image Capture Device]

Figure 1:
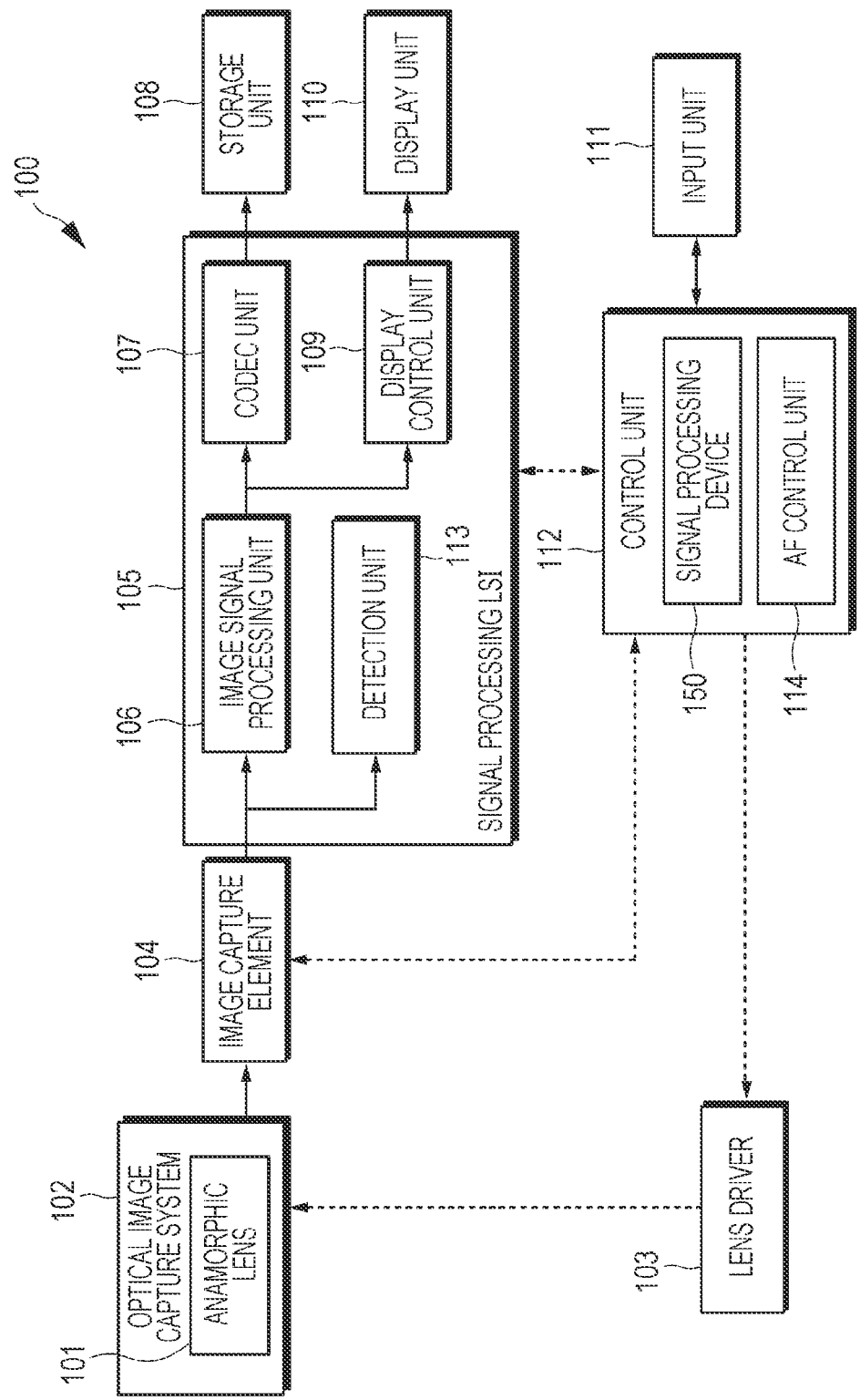
FIG. 1 is a block diagram illustrating a configuration of an image capture device according to an embodiment.

First, a configuration of an image capture device 100 including a signal processing device 150 according to an embodiment will be described with reference to FIG. 1. In the present embodiment, a displaying process is performed by the image capture device 100 provided with an anamorphic lens 101.

The image capture device 100 includes an optical image capture system 102 including the anamorphic lens 101, a lens driver 103, an image capture element 104, a signal processing large-scale integration (LSI) 105, an image signal processing unit 106, a codec unit 107, a storage unit 108, a display control unit 109, a display unit 110, an input unit 111, a control unit 112, a detection unit 113, an AF control unit 114, and a signal processing device 150.

The optical image capture system 102 includes the anamorphic lens 101 for concentrating light from a subject on the image capture element 104, a drive mechanism for zooming, a shutter mechanism, an iris mechanism, and the like. These are driven on the basis of a control signal from the control unit 112 and the lens driver 103. An optical image of the subject obtained through the optical image capture system 102 is formed on the image capture element 104 as an image capture component.

The lens driver 103 includes, for example, a microcomputer and the like, and controls operations such as driving of the anamorphic lens 101 for autofocus, the drive mechanism of the optical image capture system 102, the shutter mechanism, the iris mechanism, and the like in accordance with a control of the control unit 112. Accordingly, an exposure time (a shutter speed), an aperture value (an F value), and the like are adjusted.

The image capture element 104 photoelectrically converts the incident light from the subject into an electric charge amount and outputs as an analog image capture signal. The analog image capture signal output from the image capture element 104 is output to the image signal processing unit 106. As the image capture element 104, a charge-coupled device (CCD), a complementary metal-oxide semiconductor (CMOS), or the like is used.

The image signal processing unit 106, with respect to the image capture signal output from the image capture element 104, performs a sample hold by a correlated double sampling (CDS) processing for maintaining a good signal/noise (S/N) ratio, an auto gain control (AGC) processing, an analog/digital (A/D) conversion, and the like, and generates an image signal.

Also, the image signal processing unit 106 may perform predetermined signal processing such as demosaicing processing, white balance adjustment processing, color correction processing, gamma correction processing, Y/C conversion processing, auto exposure (AE) processing, resolution conversion processing on an image signal.

The codec unit 107 performs coding processing for recording or communication, for example, on the image signal that has been subjected to the predetermined processing.

The storage unit 108 is a large-capacity storage medium, for example, such as a hard disk, a memory stick (registered trademark of Sony Corporation), an SD memory card, and the like. An image is saved in a compressed state on the basis of standards, for example, such as Joint Photographic Experts Group (JPEG) and the like. Also, Exchangeable Image File Format (EXIF) data including information regarding the saved image and additional information such as imaging date and time and the like is also saved in association with the image. A moving image is saved in formats, for example, such as Moving Picture Experts Group 2 (MPEG-2), MPEG-4, and the like.

The display control unit 109 controls displaying generated image data on the display unit 110.

The display unit 110 is, for example, a display device including a liquid crystal display (LCD), a plasma display panel (PDP), an organic electroluminescence (EL) panel, or the like. The display unit 110 displays a user interface of the image capture device 100, a menu screen, a monitoring image during image capture, a captured image recorded in the storage unit 108, a captured moving image, and the like.

The input unit 111 includes, for example, a power button for switching between power on and power off, a release button for instructing to start recording an image, a zoom lever for adjusting zoom, a touch screen integrated with the display unit 110, and the like. When performing an input on the input unit 111, a control signal corresponding to the input is generated and output to the control unit 112. Then, the control unit 112 performs an arithmetic processing and control corresponding to the control signal.

The control unit 112 includes a central processing unit (CPU), a random access memory (RAM), a read-only memory (ROM), and the like. The ROM stores a program and the like that is read and executed by the CPU. The RAM is used as a work memory of the CPU. The CPU controls the entire image capture device 100 by executing various processes according to the program stored in the ROM and issuing commands.

The detection unit 113 uses the supplied image capture signal to perform a detection process in each of the vertical and horizontal directions of the image, detects an in-focus state to the subject in a detection range for autofocus, and acquires an amount of defocus in all detection range. The amount of defocus is an amount of deviation from the focal point. Furthermore, the detection unit 113 acquires an MTF corresponding to the amount of defocus and generates detection information including the amount of defocus and the MTF as illustrated in FIG. 2. The detection information acquired by the detection unit 113 is supplied to the AF control unit 114. It should be noted that the vertical and horizontal directions of the image correspond to the vertical and horizontal directions of the anamorphic lens 101, respectively, and the vertical and horizontal directions are assumed to be orthogonal to each other.

The AF control unit 114 determines an in-focus position of autofocus on the basis of the detection information supplied from the detection unit 113. A difference of focus to an in-focus position of the anamorphic lens 101 is an amount of focus deviation. The farther the position of the anamorphic lens 101 is from the in-focus position, the larger the amount of focus deviation, and the closer the position of the anamorphic lens 101 is to the in-focus position, the smaller the amount of focus deviation.

Then, by driving the lens driver 103 on the basis of the determined in-focus position, the AF control unit 114 performs autofocus control to move the anamorphic lens 101 by a predetermined amount along the optical axis direction to focus on the subject.

The signal processing device 150 performs a displaying process described later on the basis of a predetermined parameter of the image capture device 100.

Note that the signal processing device 150 includes a program, and the program may be installed in the image capture device 100 preliminarily or may be distributed by download, storage medium, or the like so that the user can install the program by himself/herself. Note that the signal processing device 150 is not only realized by a program, but may also be realized by combining a dedicated device, a circuit, or the like by hardware having the function.

The image capture device 100 is configured as described above. Note that, In the present technology, the image includes a frame image constituting a moving image in addition to a still image.

[1-2. Characteristics of Anamorphic Lens]

Next, characteristics of the anamorphic lens will be described. FIG. 2 is a graph illustrating an example of modulation transfer function (MTF) characteristics in the anamorphic lens. MTF is one of the indexes for evaluating the performance of a lens and indicates as a spatial frequency characteristic how faithfully the contrast of the subject can be reproduced in order to know an image formation performance of the lens. The MTF at a specific spatial frequency corresponds to a resolution and indicates that the larger the value, the higher the resolution. In FIG. 2, the horizontal axis indicates a paraxial ray position of the optical system in the horizontal direction. Also, the vertical axis indicates the MTF. In FIG. 2, a solid line indicates the MTF characteristics in the horizontal direction, and a broken line indicates the MTF characteristics in the vertical direction. Also, MTF characteristics at Fl (low frequency) are illustrated by a thick line, and MTF characteristics at Fh (high frequency) are illustrated by a thin line.

The anamorphic lens generally has a shorter focal length and a greater depth of field, in the horizontal direction than in the vertical direction. As a result, in a case where the horizontal axis of the graph in FIG. 2 is the amount of defocus, there is a feature that the MTF characteristic is less likely to decrease in the horizontal direction even if the amount of defocus is the same in the vertical and horizontal directions. Also, it is possible to mention that the inclination of the MTF characteristic differs between the vertical and horizontal directions. Therefore, it is possible to mention that an image is blurred faster in the vertical direction compared to the horizontal direction. As a result, even with the same amount of defocus, in the vertical direction compared to the horizontal direction, the MTF tends to decrease so that the image looks blurred. Also, it is possible to mention that a range of the amount of defocus, which is regarded to be in focus, is wider in the horizontal direction compared to the vertical direction.

Furthermore, a peak position of the MTF characteristic differs between the vertical and horizontal directions. While up to depend on the optical design, it is difficult to match the peak positions of the MTF characteristics between the vertical and horizontal directions under all conditions. Note that the MTF characteristics between the vertical and horizontal directions also change depending on a frequency of the subject. Note that it is assumed that the vertical direction and the horizontal direction are orthogonal to each other.

Normally, detection in autofocus is performed in the horizontal direction. However, in the anamorphic lens, since the inclination of the MTF characteristic differs between the vertical and horizontal directions, if detection is performed only in the horizontal direction, autofocus in the vertical direction does not function normally.

Due to such characteristics of the anamorphic lens, various functions including a function based on autofocus may not be normally used in the image capture device provided with the anamorphic lens in some cases. Therefore, by performing the process described below, even in the image capture device provided with the anamorphic lens, the user can use the functions equipped with the general image capture device without any special operation or handling.

[1-3. First Displaying Process by Signal Processing Device: Displaying In-Focus Mark]

A first aspect of a process in the signal processing device 150 will be described. The first aspect is an in-focus mark displaying process in the image capture device 100 provided with the anamorphic lens 101.

First, a mode of displaying the in-focus mark will be described. The in-focus mark is, for example, a circular icon indicating the in-focus state, which is superimposed and displayed on a through image on the display unit 110 during imaging with the image capture device 100. FIGS. 3A, 3B, 3C, and 3D illustrate a mode of an icon form and lighting up, and the meaning of the mode.

Figure 3A:
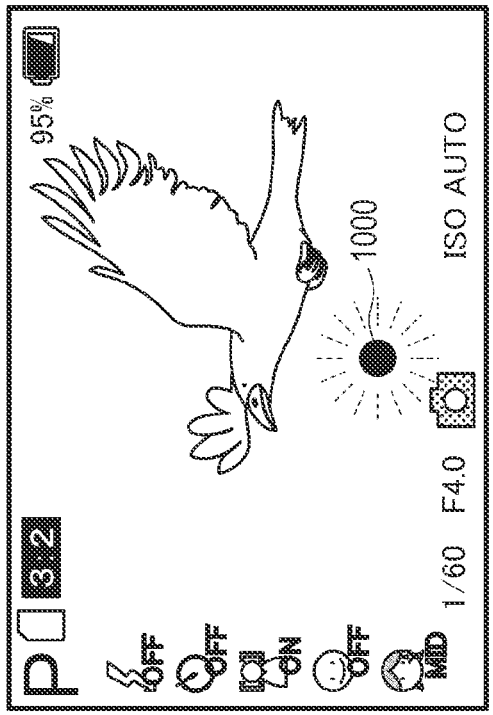
FIGS. 3A, 3B, 3C, and 3D are explanatory diagrams of an in-focus mark displayed according to a first aspect of a displaying process.

In a case where an in-focus mark 1000 is lighting up in a first mode as illustrated in FIG. 3A, the case indicates that the subject is in focus.

Figure 3B:
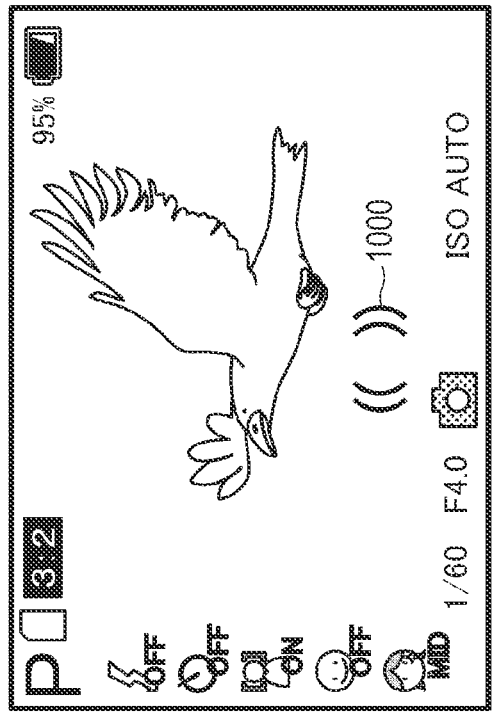

Also, in a case where the in-focus mark 1000 is blinking in the first mode as illustrated in FIG. 3B, the case indicates that the subject is out of focus.

Figure 3C:
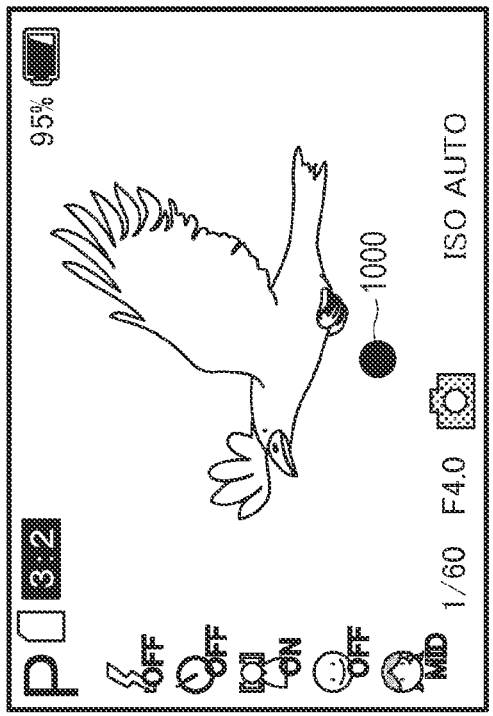

Also, in a case where the in-focus mark 1000 is lighting up in a second mode as illustrated in FIG. 3C, the case indicates that the subject is in focus, but the focus position changes according to a movement of the subject.

Figure 3D:
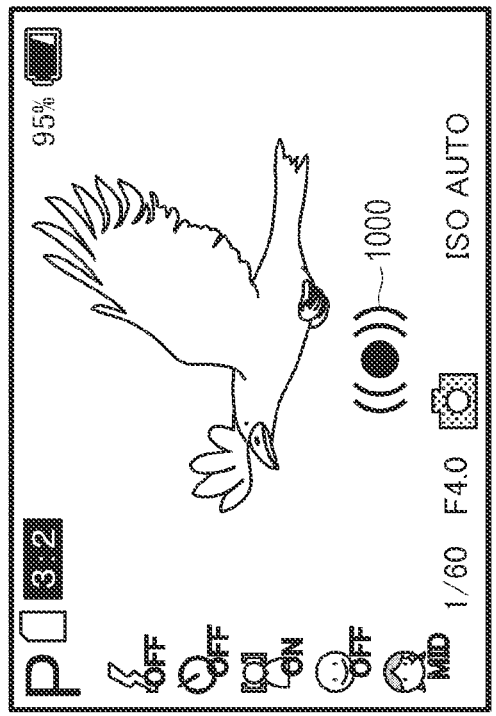

Furthermore, in a case where the in-focus mark 1000 is lighting up in a third mode as illustrated in FIG. 3D, the case indicates a state that is on the way of focusing and looking for a position in focus.

Note that the form and lighting mode of the in-focus mark 1000 are not limited to those illustrated in FIGS. 3A, 3B, 3C, and 3D. The shape is not limited to a circular shape, and other shapes may be used. In addition to distinguishing between lighting up and blinking, different states may be indicated by a change in shape, a change in color, and the like.

Figure 4:
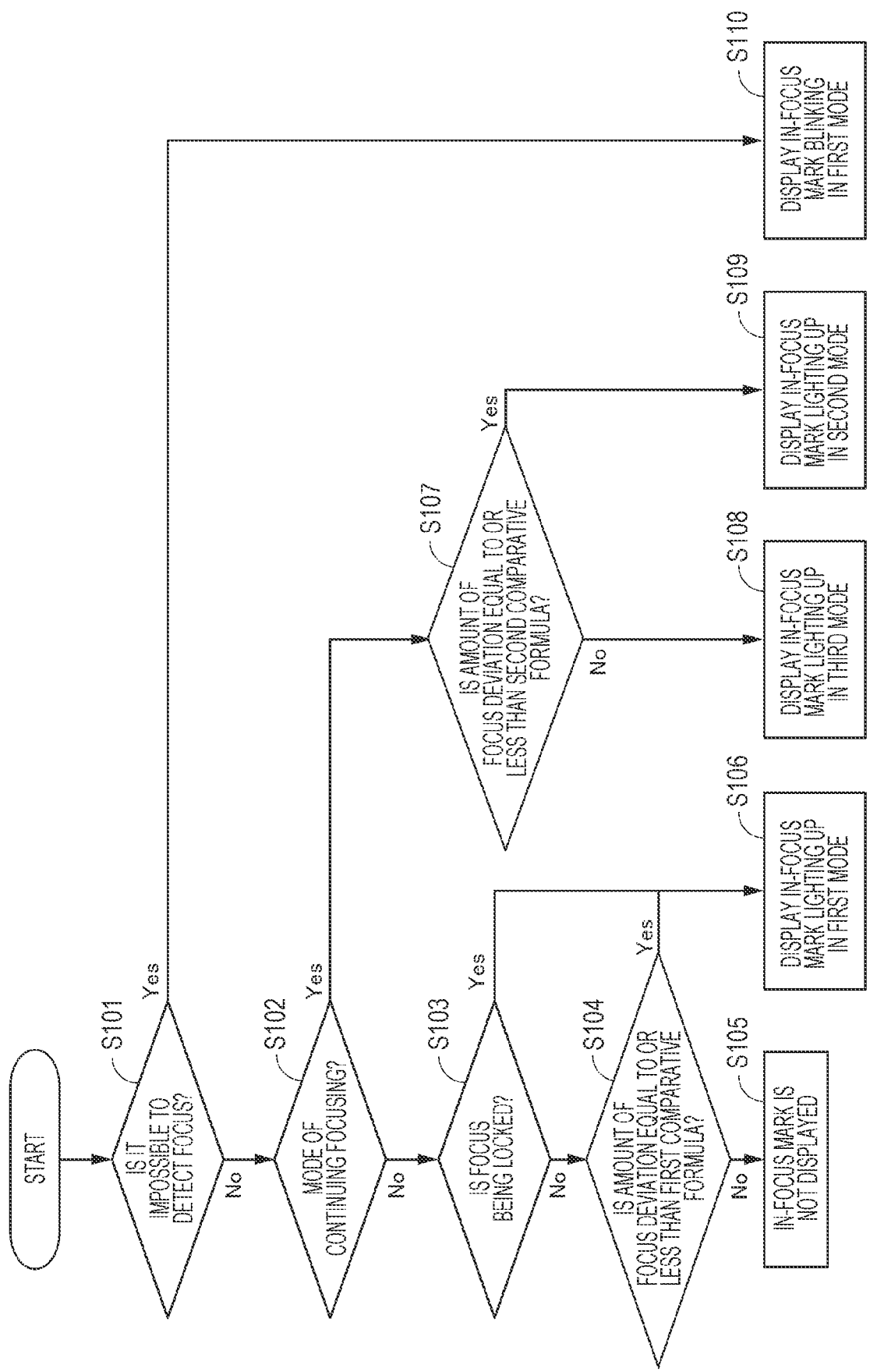
FIG. 4 is a flowchart illustrating a processing of the first aspect.

Next, the in-focus mark displaying process in the signal processing device 150 will be described with reference to a flowchart of FIG. 4. Note that "amount of focus deviation" in the description of the flowchart below is an amount of focus deviation calculated by the processing in autofocus, and, in a case where the amount of focus deviation differs between the vertical and horizontal directions, one value is determined by a predetermined method.

Examples of the method of determining either one of the amounts of focus deviation are a method of taking an average of the amounts of focus deviation in the vertical and the horizontal directions, a method of making the determination on the basis of the MTF characteristics, a method of making the determination on the basis of the MTF characteristics and the inclination of the subject, a method of making the determination on the basis of indicators such as a degree of reliability, a degree of similarity, and the like calculated by the sum of absolute difference (SAD) as one of the methods for calculating the degree of similarity of block matching used for detection of phase-detection AF, a method of prioritizing the vertical direction, and the like.

Also, there is a method of adopting the amount of focus deviation either in the vertical direction or the horizontal direction whichever has the smaller F value, or letting the user select the amount of focus deviation.

First, in step S101, it is determined whether or not it is impossible to detect focus. In a case where it is possible to detect focus, the process proceeds to step S102 (No in step S101). Next, it is determined whether or not the image capture device 100 is in a mode of continuing focusing. This is set by the user or automatically determined and can be determined by referring to the setting information of the image capture device 100.

In a case where the image capture device 100 is not in the mode of continuing focusing in step S102, the process proceeds to step S103 (No in step S102). Next, in step S103, it is determined whether or not the focus is being locked. In a case where the focus is not being locked, the process proceeds to step S104 (No in step S103).

Next, in step S104, the amount of focus deviation is compared with a first comparison formula presented in [Formula 1] below.

$$\text{Amount of focus deviation} < \sqrt{(F \text{ value in the horizontal direction} \times F \text{ value in the vertical direction}) \times d1} \quad \text{[Formula 1]}$$

In the first comparison formula, the parameter d1 is a constant for determining the allowable focus width. Also, the F value in the horizontal direction and the F value in the vertical direction correspond to the parameters being predetermined in the claims. Note that [Formula 1] takes the geometric mean in the horizontal and vertical directions, but it is not limited to this, and there is also a method of calculating with an arithmetic mean or a weighted mean that is weighted in the horizontal direction/vertical direction.

In a case where the amount of focus deviation is larger than the first comparison formula in step S104, the process proceeds to step S105 (Yes in step S104). Then, in step S105, the signal processing device 150 performs processing so that the in-focus mark 1000 is not displayed on the display unit 110.

The explanation returns to step S103. In a case where the focus is being locked in step S103, the process proceeds to step S106, and the in-focus mark 1000 indicating that the subject is in focus, which is illustrated in FIG. 3A, is displayed on the display unit 110. It is because if the focus can be detected and the focus is being fixed, it is possible to determine to be in the state in which the subject is in focus.

Also, in a case too where the amount of focus deviation is smaller than the first comparison formula in step S104, the in-focus mark 1000 indicating that the subject is in focus, which is illustrated in FIG. 3A, is displayed on the display unit 110 in step S106. It is because, in the determination in step S104, in a case where the amount of focus deviation is equal to or less than the first comparison formula, it is possible to determine that the amount of focus deviation is small and the subject is in focus.

The explanation returns to step S102. In a case where the image capture device 100 is in the mode of continuing focusing in step S102, the process proceeds to step S107 (Yes in step S102). Next, in step S107, the amount of focus deviation is compared with a second comparison formula presented in [Formula 2] below.

$$\text{Amount of focus deviation} < \sqrt{(F \text{ value in the horizontal direction} \times F \text{ value in the vertical direction}) \times d2} \quad \text{[Formula 2]}$$

In the second comparison formula, the parameter d2 is a constant for determining the allowable focus width. Also, the F value in the horizontal direction and the F value in the vertical direction correspond to the parameters being predetermined in the claims. Note that [Formula 2] takes the geometric mean in the horizontal and vertical directions, but it is not limited to this, and there is also a method of calculating with an arithmetic mean or a weighted mean that is weighted in the horizontal direction/vertical direction.

Also, in a case where the amount of focus deviation is larger than the second comparison formula, the process proceeds to step S108 (No in step S107). Then, in step S108, the in-focus mark 1000 indicating "being a state being on the way to focusing and searching for a position that is in-focus", which is illustrated in FIG. 3D, is displayed on the display unit 110. It is because the case that it is possible to detect focus and the amount of focus deviation is equal to or larger than the first comparison formula while trying to focus indicates that the focus deviation is large, and it is possible to say that the subject is not currently in focus.

On the other hand, in a case where the amount of focus deviation is smaller than the second comparison formula, the process proceeds to step S109 (Yes in step S107). In step S109, the in-focus mark 1000 indicating "the subject is in focus, but the focus position changes according to a movement of the subject", which is illustrated in FIG. 3C, is displayed on the display unit 110. It is because the case that the amount of focus deviation is equal to or less than the first comparison formula indicates that the focus deviation is small, and it is possible to say that the subject is currently in focus.

The explanation returns to step S101. The process in which it is impossible to detect focus in step S101 proceeds to step S110 (Yes in step S101), and the in-focus mark 1000 indicating that the subject is not in focus illustrated in FIG. 3B is displayed on the display unit 110.

The first aspect of processing in the signal processing device 150 is configured as described above. According to the first aspect of the present embodiment, the user can use the function of displaying the in-focus mark in the image capture device 100 provided with the anamorphic lens 101 without any special operation or handling.

[1-4. Second Displaying Process by Signal Processing Device: Processing In-Focus Area]

Next, a second aspect of a process in the signal processing device 150 will be described. The second aspect is a process of arranging and displaying the in-focus area in the image capture device 100 provided with the anamorphic lens 101.

The arrangement and display of the in-focus area means that a plurality of in-focus areas, which is detection ranges for autofocus on the input image, is arranged on the image and superimposed on the through image (the monitoring image) displayed on the display unit 110 to display the in-focus area that overlaps the in-focus subject. The detection unit 113 of the image capture device 100 detects a state of in-focus of the subject (a degree of in-focus) in each in-focus area and acquires defocus information indicating an amount of deviation from a focal point in all of the in-focus areas. With this display of the in-focus area, the user can confirm which part of the subject is currently in focus by looking at the display unit 110.

Figure 5A:
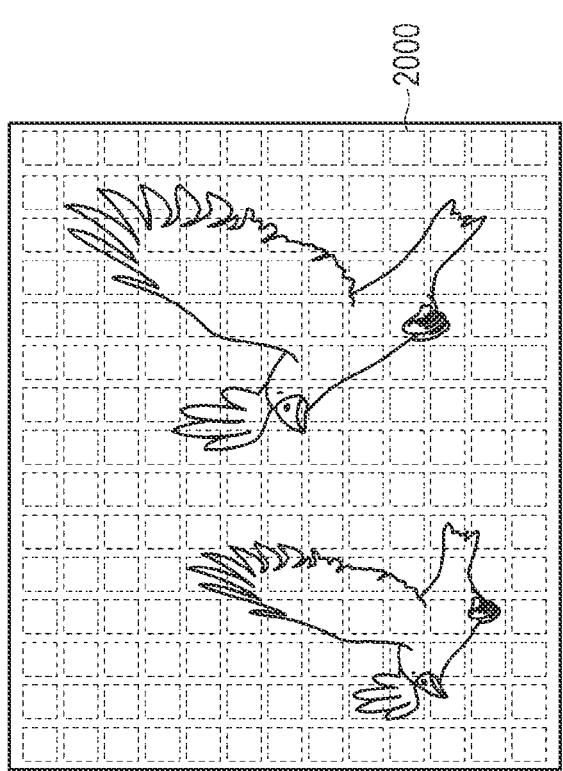
FIGS. 5A and 5B are explanatory diagrams of an in-focus area arranged in a second aspect of the displaying process.
Figure 5B:
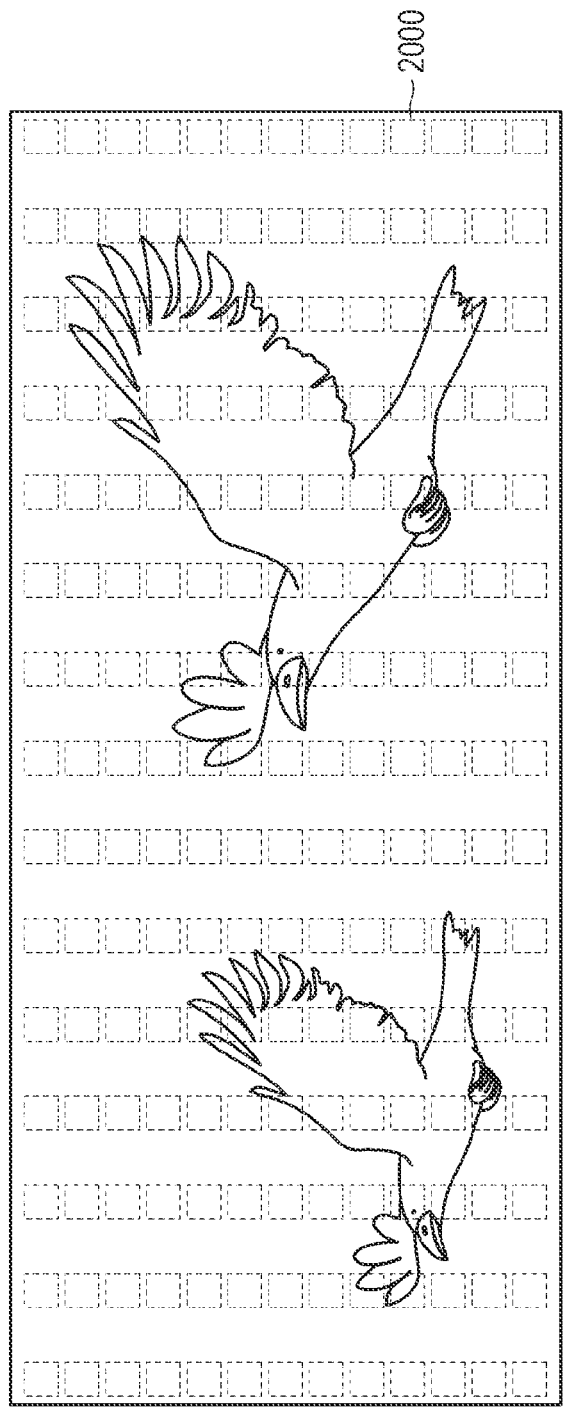

FIG. 5A illustrates an image in a state of being compressed in the horizontal direction by the anamorphic lens 101 at the time of imaging by the image capture device 100 and an arrangement of an in-focus area 2000 with respect to the image. Also, FIG. 5B illustrates a state in which the image compressed in the horizontal direction by the anamorphic lens 101 is stretched in the horizontal direction to reproduce the image at the time of reproduction and the arrangement of the in-focus area 2000 with respect to the image. Note that, in FIGS. 5A, 5B, 6A, 6B, 7A, 7B, 8, 9A and 9B, one of the plurality of in-focus areas is designated by the sign 2000, but the one only is not the in-focus area, but all of the rectangular frames in dash lines (solid lines in FIGS. 9A and 9B) illustrated superimposed on the image are the in-focus areas.

In the present embodiment, the image capture device 100 has a function of confirming both a compressed state and a stretched state at the time of imaging and shall be possible to switch and display the compressed state illustrated in FIG. 5A and the stretched state illustrated in FIG. 5B displayed on the display unit 110 and to present to the user.

As described above, the anamorphic lens 101 is a lens having different focal lengths in the vertical and horizontal directions, and an image is recorded in a state that the image is compressed in the horizontal direction when imaging. Then, by stretching the image in the horizontal direction when reproducing the image, a horizontally long natural image being equal to or larger than an aspect of a recording element is realized.

In the present technology, the state of the in-focus area 2000 (an arrangement interval (a placement density)) is set to be different between the state of the image compressed in the horizontal direction illustrated in FIG. 5A and the state of the image stretched in the horizontal direction illustrated in FIG. 5B. Therefore, the in-focus areas 2000 become to be arranged more densely in the state of the image compressed in the horizontal direction illustrated in FIG. 5A than in the state of the image stretched in the horizontal direction illustrated in FIG. 5B.

In a case where the in-focus area 2000 is arranged so as to cover the entire image in the compressed state of FIG. 5A, the arrangement of the in-focus area 2000 is changed as illustrated in FIG. 5B so that it is possible to cover the entire image in a similar way by widening the horizontal spacing of the in-focus area 2000 in the stretched state.

In the example of FIGS. 5A and 5B, the arrangement interval of the in-focus area 2000 is increased corresponding to the ratio of the magnification of zoom for the stretching in the horizontal direction. The magnification of zoom is the parameter being predetermined in the claims. Specifically, in a case where the state compressed in the horizontal direction illustrated in FIG. 5A is compressed as much as 50 percent of the state stretched in the horizontal direction illustrated in FIG. 5B, the arrangement of the in-focus area 2000 is compressed as much as 50 percent in the horizontal direction in the state of FIG. 5A compared to the state of FIG. 5B. However, in the example of FIGS. 5A and 5B, there is no change in the number and size of the in-focus areas 2000.

Figure 6A:
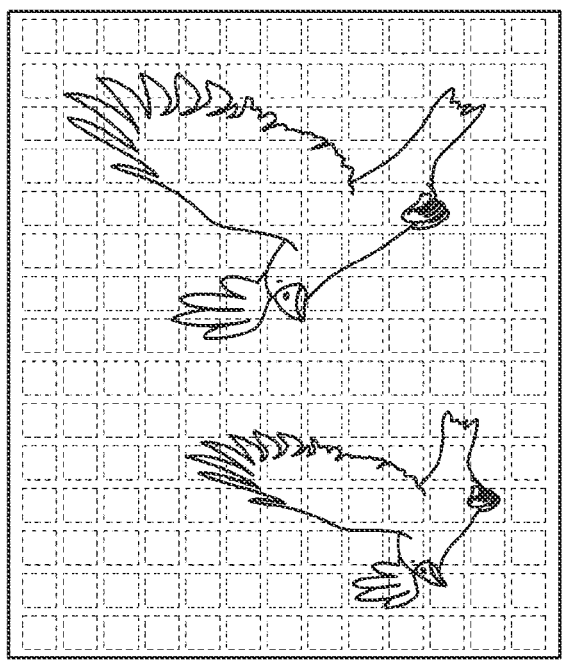
FIGS. 6A and 6B are examples of an arrangement of an in-focus area in a case where the present technology is not used.
Figure 6B:
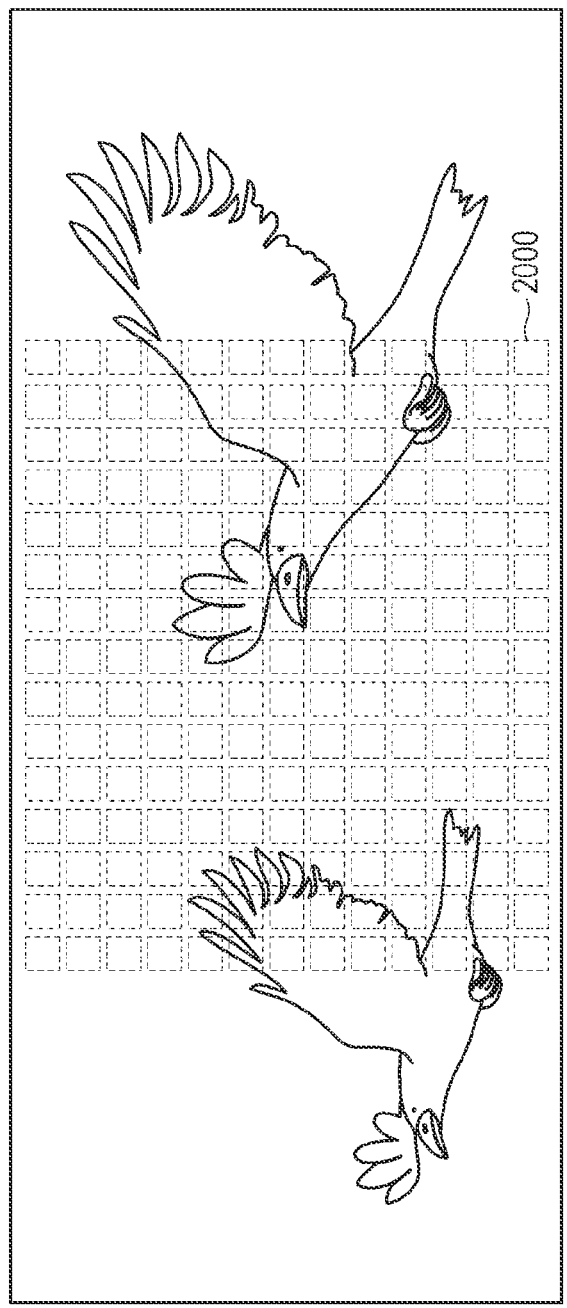

In a case where the compression and stretching of the image in the horizontal direction by using the anamorphic lens 101 is not associated with the arrangement of the in-focus area 2000, in the stretched state as illustrated in FIG. 6B, a range in which the in-focus area 2000 is not arranged appears.

Therefore, as illustrated in FIGS. 5A and 5B, by changing the arrangement of the in-focus area 2000 corresponding to the compression and stretching in the horizontal direction of the image, it is possible to cover the entire image with a plurality of in-focus areas 2000 in either state.

Figure 7A:
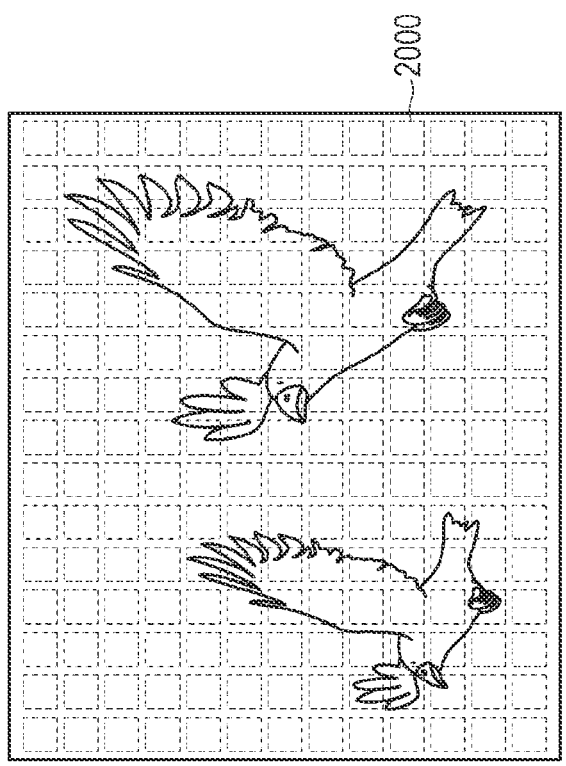
FIGS. 7A and 7B are explanatory diagrams of another example of the in-focus area arranged in the second aspect of the displaying process.
Figure 7B:
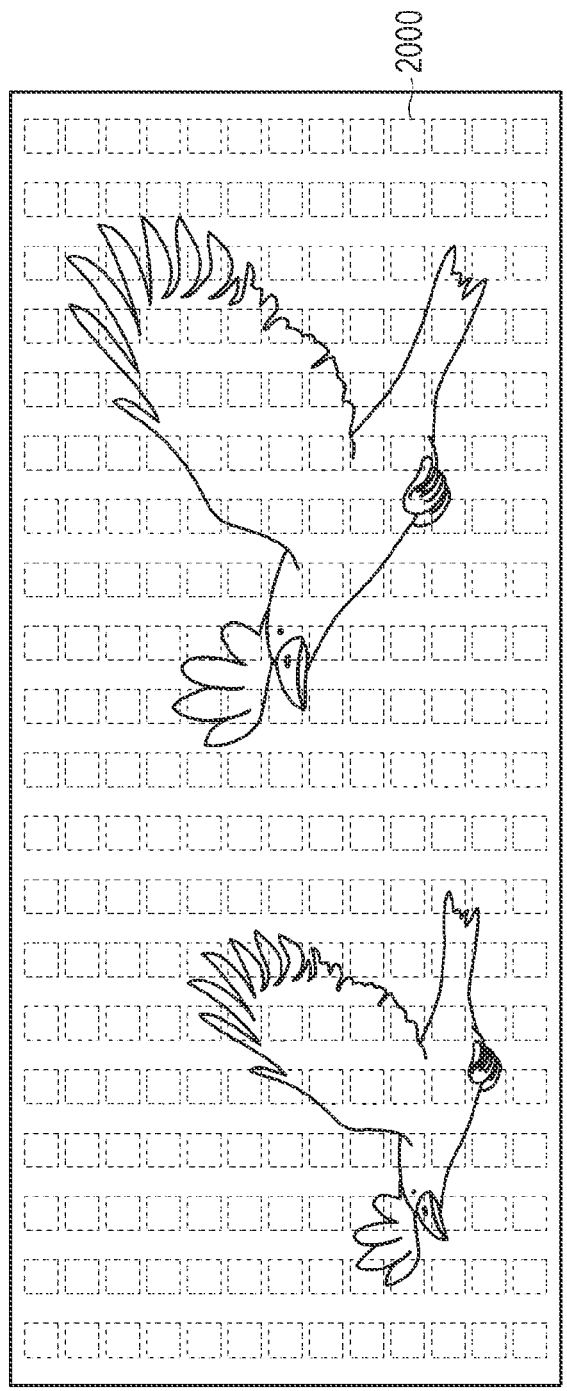

Note that the change of the state of the in-focus area 2000 may not only be the change of the arrangement interval of the in-focus area 2000 as described above but also be a change of the number of in-focus areas 2000 as illustrated in FIGS. 7A and 7B. In the example of FIGS. 7A and 7B, the number of in-focus areas 2000 in the horizontal direction is increased in the stretched state illustrated in FIG. 7B as compared with the compressed state illustrated in FIG. 7A.

Furthermore, the state of the in-focus area 2000 may be changed by changing the shape of the in-focus area 2000, changing the area in which the in-focus area 2000 is arranged, or the like.

Figure 8:
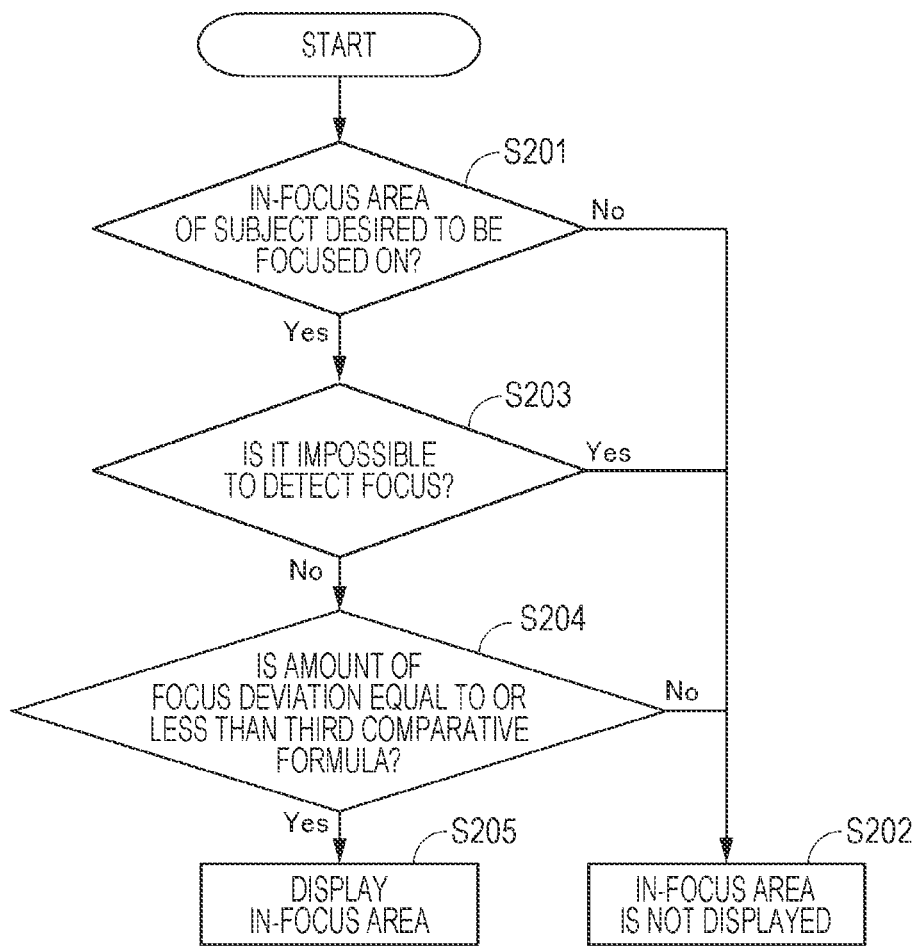
FIG. 8 is a flowchart illustrating a processing of the second aspect.
Figure 9A:
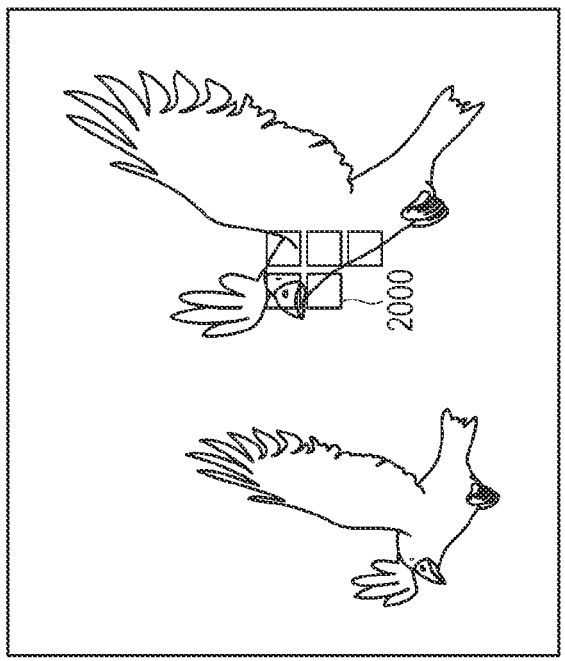
FIGS. 9A and 9B are diagrams illustrating a state in which only the in-focus area that is in focus is displayed.
Figure 9B:
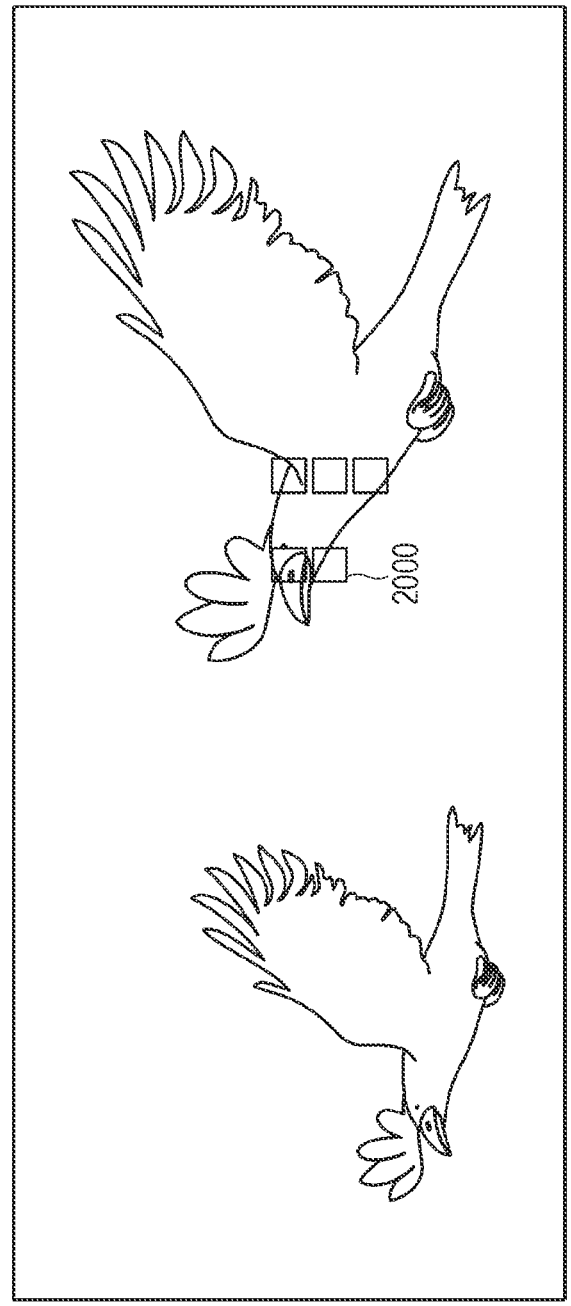

Next, with reference to FIG. 8, a flow of the process of displaying the in-focus area in the image capture device 100 provided with the anamorphic lens 101 as illustrated in FIGS. 9A and 9B will be described. This process is performed for each of all the in-focus areas 2000, and is a process for determining whether or not superimposing each in-focus area 2000 on the through image and displaying on the display unit 110. The in-focus area displayed superimposed on the through image is the in-focus area corresponding to the position in which the subject is in focus in the image.

First, in step S201, it is determined whether or not the in-focus area is an in-focus area that overlaps the subject on which the user desires to focus. This determination can be made using, for example, subject detection, person detection, distance map of the image, or the like. For example, in a case where a person detected by person detection overlaps the in-focus area, since the person is usually the subject that the user desires to focus on in a photograph, it is determined that the in-focus area overlaps the subject on which the user desires to focus. On the other hand, in a case where the detected person does not overlap the in-focus area, it is determined that the in-focus area does not overlap the subject on which the user desires to focus.

In a case where the in-focus area is not the in-focus area that overlaps the subject on which the user desires to focus, the process proceeds to step S202 (No in step S201). Then, in step S202, a process in which the in-focus area 2000 is not displayed on the display unit 110 is performed.

On the other hand, in step S201, in a case where the in-focus area is the in-focus area that overlaps the subject on which the user desires to focus, the process proceeds to step S203 (Yes in step S201). Next, in step S203, it is determined whether or not it is impossible to detect focus. In a case where it is not possible to detect focus, the process proceeds to step S202 (Yes in step S203), and a process in which the in-focus area is not displayed on the display unit 110 is performed.

On the other hand, in a case where it is possible to detect focus, the process proceeds to step S204 (No in step S203). Next, in step S204, the amount of focus deviation is compared with a third comparison formula presented in [Formula 3] below.

Amount of focus deviation<√(F value in the horizontal direction×F value in the vertical direction)×d3     [Formula 3]

In the third comparison formula, the parameter d3 is a constant for determining the allowable focus width. Also, the F value in the horizontal direction and the F value in the vertical direction correspond to the parameters being predetermined in the claims. Note that [Formula 3] takes the geometric mean in the horizontal and vertical directions, but it is not limited to this, and there is also a method of calculating with an arithmetic mean or a weighted mean that is weighted in the horizontal direction/vertical direction.

Then, as a result of the comparison, in a case where the amount of focus deviation is larger than the third comparison formula, the process proceeds to step S202 (No in step S204), and a process that the in-focus area is not displayed on the display unit 110 is performed.

On the other hand, as a result of the comparison, in a case where the amount of focus deviation is smaller than the third comparison formula, the process proceeds to step S205 (Yes in step S204), and because the subject is in focus in that in-focus area, a process of displaying that in-focus area on the display unit 110 is performed.

By performing this process for each of all the in-focus areas, only the in-focus area in which the subject is in focus is displayed on the display unit 110.

It is also possible to apply this change in the state of the in-focus area to a display for metering, a subject detection function (including a face detection function), and the like.

Figure 10A:
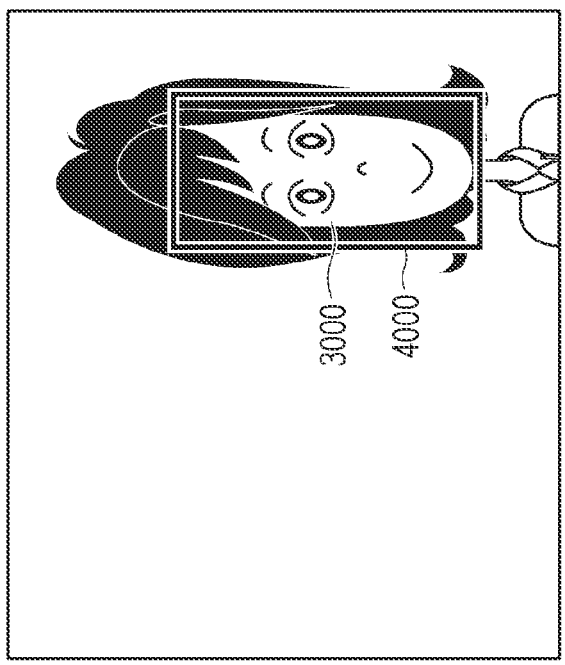
FIGS. 10A and 10B are diagrams illustrating a display of a subject detection frame.
Figure 10B:
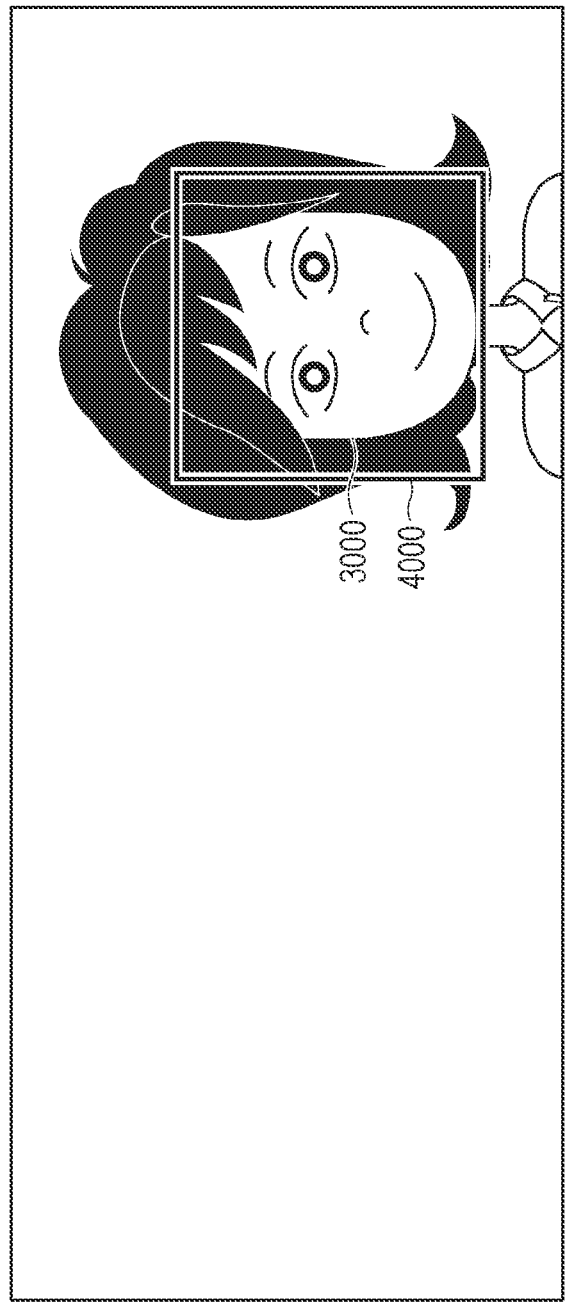

For example, as illustrated in FIGS. 10A and 10B, a face detection frame 4000, which is an icon displayed according to a face 3000 detected in the image by the face detection function during imaging is considered. In this case, in the state of the image compressed in the horizontal direction illustrated in FIG. 10A and the stretched state of the image illustrated in FIG. 10B, the shape of the face detection frame 4000 is changed according to the ratio of the magnification of zoom. Therefore, at the time of confirming the stretched state of the image, the face detection frame 4000 is also displayed in the shape and size according to the shape and size of the face 3000.

The second aspect of the processing in the signal processing device 150 is configured as described above. According to the second aspect of the present embodiment, the user can use the function of displaying the in-focus area in the image capture device 100 provided with the anamorphic lens 101 without any special operation or handling.

As described above, the embodiment of the present technology is configured. According to this embodiment, even in the image capture device 100 provided with the anamorphic lens 101, it is possible to use the functions equipped with an ordinary camera, displaying the in-focus mark, displaying the in-focus area, and detecting the subject, without any special handling.

2. Modification Example

Although the embodiments of the present technology have been specifically described above, the present technology is not limited to the above-described embodiments, and various types of modifications based on the technical idea of the present technology are possible.

It is possible to apply the present technology to both a type of image capture device integrated with the anamorphic lens and an external type that the anamorphic lens is attached to the image capture device as an attachment, and can also be applied to both imaging a still image and imaging a moving image.

The present technology may also be configured as below.

(1)

A signal processing device that performs a displaying process in a display unit on the basis of a parameter being predetermined in an image capture device provided with an anamorphic lens.

(2)

The signal processing device according to (1), in which the signal processing device displays an icon indicating an in-focus state on the display unit as the displaying process.

(3)

The signal processing device according to (2), in which the parameters are an F value in a direction corresponding to a vertical direction of the anamorphic lens and an F value in a direction corresponding to a horizontal direction of the anamorphic lens.

(4)

The signal processing device according to (2) or (3), in which the signal processing device determines a mode of displaying the icon on the basis of a result of comparison between an amount of focus deviation and an average of the F value in the direction corresponding to the vertical direction and the F value in the direction corresponding to the horizontal direction.

(5)

The signal processing device according to (1), in which the signal processing device controls a state of a plurality of in-focus areas in the display unit as the displaying process.

(6)

The signal processing device according to (5), in which the parameters are a magnification of zoom in a direction corresponding to a vertical direction of the anamorphic lens and a magnification of zoom in a direction corresponding to a horizontal direction of the anamorphic lens, and the signal processing device changes the state of the in-focus area on the basis of the parameters.

(7)

The signal processing device according to (6), in which the signal processing device changes the state of the in-focus area corresponding to a compressed state in the horizontal direction of an image being based on an image capture signal acquired by using the anamorphic lens so as to be different from the state of the in-focus area corresponding to a stretched state in the horizontal direction of the image.

(8)

The signal processing device according to (7), in which the state of the in-focus area is an arrangement of the in-focus area, and the signal processing device changes the arrangement of the in-focus area so that the arrangement of the in-focus area corresponding to the compressed state is denser than the arrangement of the in-focus area area corresponding to the stretched state.

(9)

The signal processing device according to any one of (5) to (8), in which the signal processing device determines whether or not to display an icon indicating the plurality of in-focus areas on the display unit on the basis of an F value in a direction corresponding to a vertical direction of the anamorphic lens and an F value in a direction corresponding to a horizontal direction of the anamorphic lens.

(10)

The signal processing device according to (1), in which the signal processing device controls a display of an icon indicating a subject detected by a subject detection function in the display unit as the displaying process.

(11)

A signal processing method including performing a displaying process in a display unit included in an image capture device on the basis of a parameter being predetermined in the image capture device provided with an anamorphic lens.

(12)

A signal processing program for causing a computer to execute a signal processing method including performing a displaying process in a display unit included in an image capture device on the basis of a parameter being predetermined in the image capture device provided with an anamorphic lens.

(13)

An image capture device including:

an anamorphic lens; and a signal processing unit that performs a displaying process in a display unit on the basis of a parameter being predetermined.

REFERENCE SIGNS LIST

100 Image capture device
101 Anamorphic lens
150 Signal processing device

The invention claimed is:

1. A signal processing device, comprising:
circuitry configured to:
perform a displaying process in a display unit based on parameters being predetermined in an image capture device provided with an anamorphic lens, wherein
the parameters are an F value in a direction corresponding to a vertical direction of the anamorphic lens and an F value in a direction corresponding to a horizontal direction of the anamorphic lens.

2. The signal processing device according to claim 1, wherein
the circuitry is further configured to display an icon indicating an in-focus state on the display unit as the displaying process.

3. The signal processing device according to claim 2, wherein
the circuitry is further configured to determine a mode of displaying the icon based on a result of comparison between an amount of focus deviation and an average of the F value in the direction corresponding to the vertical direction and the F value in the direction corresponding to the horizontal direction.

4. The signal processing device according to claim 1, wherein
the circuitry is further configured to determine whether to display an icon indicating a plurality of in-focus areas on the display unit based on the F value in the direction corresponding to the vertical direction of the anamorphic lens and the F value in the direction corresponding to the horizontal direction of the anamorphic lens.

5. The signal processing device according to claim 1, wherein
the circuitry is further configured to control display of an icon indicating a subject detected by a subject detection function in the display unit as the displaying process.

6. A signal processing device comprising:
circuitry configured to:
perform a displaying process in a display unit based on parameters being predetermined in an image capture device provided with an anamorphic lens, wherein
the parameters are a magnification of zoom in a direction corresponding to a vertical direction of the anamorphic lens and a magnification of zoom in a direction corresponding to a horizontal direction of the anamorphic lens,
the displaying process controls a state of a plurality of in-focus areas in the display unit, and
the state of the plurality of in-focus areas is changed based on the parameters.

7. The signal processing device according to claim 6, wherein
the circuitry is further configured to change the state of the plurality of in-focus areas corresponding to a compressed state in the horizontal direction of an image, being based on an image capture signal acquired by using the anamorphic lens, so as to be different from the state of the plurality of in-focus areas corresponding to a stretched state in the horizontal direction of the image.

8. The signal processing device according to claim 7, wherein
the state of the plurality of in-focus areas is an arrangement of the plurality of in-focus areas, and
the circuitry is further configured to change arrangement of the plurality of in-focus areas so that the arrangement of the plurality of in-focus areas corresponding to the compressed state is denser than the arrangement of the plurality of in-focus areas corresponding to the stretched state.

9. A signal processing method, comprising:
performing a displaying process in a display unit included in an image capture device based on parameters being predetermined in the image capture device provided with an anamorphic lens, wherein
the parameters are an F value in a direction corresponding to a vertical direction of the anamorphic lens and an F value in a direction corresponding to a horizontal direction of the anamorphic lens.

10. A non-transitory computer-readable medium having stored thereon computer-executable instructions, which when executed by a computer, cause the computer to execute operations, the operations comprising:
performing a displaying process in a display unit included in an image capture device based on parameters being predetermined in the image capture device provided with an anamorphic lens, wherein
the parameters are an F value in a direction corresponding to a vertical direction of the anamorphic lens and an F value in a direction corresponding to a horizontal direction of the anamorphic lens.

11. An image capture device, comprising:
an anamorphic lens; and
a signal processing unit configured to perform a displaying process in a display unit based on parameters being predetermined, wherein
the parameters are an F value in a direction corresponding to a vertical direction of the anamorphic lens and an F value in a direction corresponding to a horizontal direction of the anamorphic lens.

\* \* \* \* \*